United States Patent Office 3,239,425
Patented Mar. 8, 1966

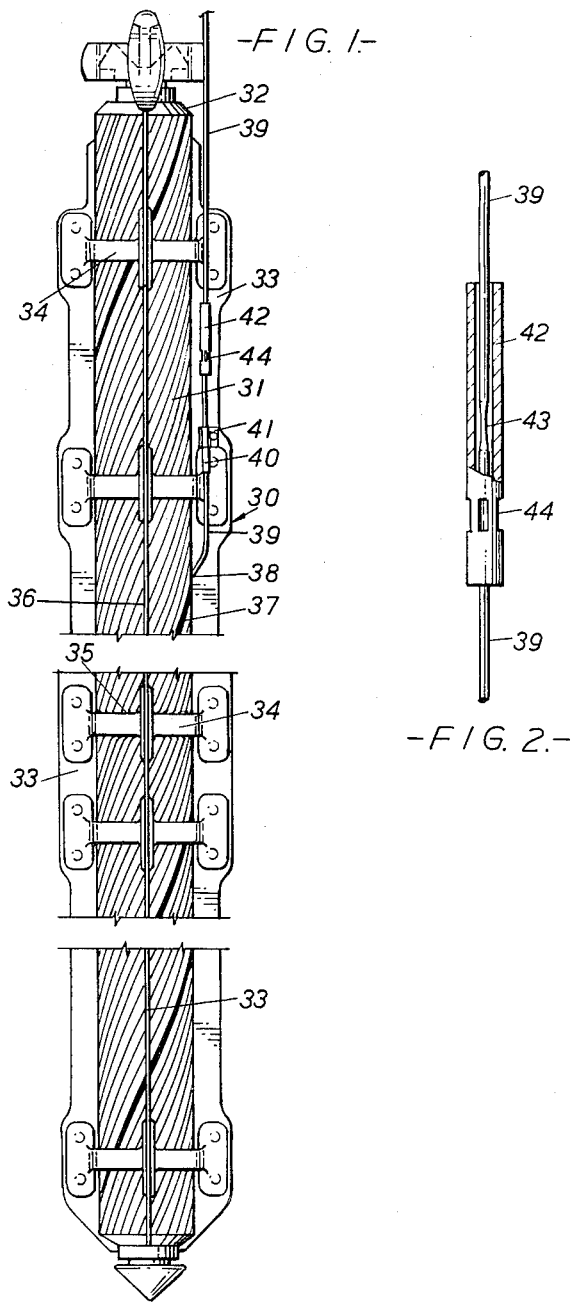

3,239,425
FUEL ELEMENT FOR A NUCLEAR REACTOR WITH AN ATTACHED THERMOCOUPLE CABLE
Piyatilleke Perera Guneratne, Seascale, Cumberland, England, assignor to United Kingdom Atomic Energy Authority, London, England
Filed May 21, 1962, Ser. No. 196,166
Claims priority, application Great Britain, May 24, 1961, 18,835/61
3 Claims. (Cl. 176—66)

This invention relates to fuel elements for nuclear reactors and is concerned with such fuel elements having thermocouple cables attached thereto for measuring the temperature of the fuel element whilst loaded in a nuclear reactor.

It is not possible to use the normal charging and discharging machinery for the charging and discharging of fuel elements with thermocouple cables attached to them as the thermocouple cable may become entangled with the machinery and, also, arrangements have to be made to connect and disconnect the thermocouple cable to and from the temperature recording instruments. Charging and discharging of such fuel elements has therefore previously been carried out manually but discharging in particular is difficult as the element is then highly radioactive. Accordingly complicated devices have been developed for severing the connection between the thermocoupling cable and the fuel element prior to discharge of the element by the normal machinery.

The present invention consists in a nuclear reactor fuel element having a thermocouple cable attached thereto, the cable having a portion of reduced cross-section at which the cable breaks preferentially on pulling on the cable.

When a fuel element according to the invention is to be discharged from a reactor the cable is jerked to break it and may then be withdrawn from the reactor so that the fuel element can be discharged by the normal discharging machinery.

The reduced cross-section may be produced in the cable by local swaging or by machining a V or U groove on the cable surface.

Typically a cable of diameter 1/16 in. is reduced to a diameter of 0.044 in. over a length of 1/4 in. Such a cable comprising chromel and alumel conductors in a stainless steel sheath packed with magnesium oxide will break at approximately 30 lbs. pull. The break will be clean so the cable can be wound up out of the reactor through small clearance holes.

Preferably the portion of reduced cross-section is protected against possible flexing during charging and also against movement caused directly by the coolant flow or by vibration of the fuel element. This protection may be provided by a sleeve installed over the portion of reduced cross-section. The sleeve may be anchored to the thermocouple hot junction side of the portion of reduced cross-section by crimping the sleeve to the cable, for example. Alternatively or in addition the sleeve may be fixed to the fuel element. On pulling on the cable the break will occur inside the sleeve and the sleeve will remain with the fuel element or that part of the cable attached to the fuel element when the remainder of the cable is withdrawn.

An embodiment of the invention will now be described with reference to the accompanying drawings wherein:

FIGURE 1 is a fragmentary side elevation of a nuclear reactor fuel element, and

FIGURE 2 is an enlarged part-sectional side view of a detail.

Referring to the drawings, in the construction shown therein, FIGURE 1 illustrates a fuel element 30 for a gas-cooled nuclear reactor such as that at Bradwell, Essex, England, and has helical heat transfer fins 31 provided on its sheath 32. It furthermore has four longitudinal splitter fins 33 equally spaced around the fuel element 30, the splitter fins 33 being assembled by braces 34 welded thereto and one of the braces 34 being accommodated in a circumferential groove 35 in the heat transfer fins 31 for longitudinal location of the splitter and brace assembly on the sheath 32. Each splitter fin 33 is located in a longitudinal groove 36 in the heat transfer fins 31 for prevention of rotation of said assembly relative to the sheath 32.

The fuel element is intended to provide for temperature measurement during its operation in a fuel element channel of a nuclear reactor. The temperature either of the sheath 32 or of the nuclear fuel member which the sheath 32 contains, or both, may be measured. The fuel element 30 has a thickened heat transfer fin 37 within which at 38 is provided an aperture containing a thermocouple hot junction. Accommodation of the thermocouple hot junction may be as shown in British Patent No. 806,490 except that instead of providing a thickened wall of the sheath as shown therein, the thickened fin 37 shown in FIGURE 1 hereof is provided to serve the same purpose, the aperture at 38 in the fin 37 being a blind-ended hole. Alternatively or in addition, not shown, the thermocouple hot junction may be provided in the nuclear fuel member contained in the sheath 32, for example as described, and as shown in FIGURE 2, of British Patent No. 844,211. A thermocouple cable 39, conveniently of chromel and alumel conductors disposed in a stainless steel sheath packed with magnesium oxide, extends from the hot junction in either the fin 37 or the nuclear fuel member, whichever is employed, or a cable may extend from both, where provided (in which case the assembly hereinafter described is duplicated), along one of the splitter fins 33, is guided or held by a sleeve or ferrule 40 secured by a plate 41 spot welded to the splitter fin 33, and extends to a sleeve member 42 (see particularly FIGURE 2) which is crimped, as shown at 44, or alternatively brazed, to the cable 39. Within the sleeve 42 the cable 39 is reduced in cross-section at 43, either by swaging or by machining of a longitudinal V or U groove. The sleeve 42 thus protects the reduced section at 43 against possible flexing and breakage during charging of the fuel element into its operative position and also whilst the fuel element is in its operative position and the cable is subjected to vibration or other movement by the flow of coolant over the fuel element. The sleeve 42 is preferably secured to the splitter fin 33 by welding so that after intentional breaking of the thermocouple cable, that part of the cable remaining with the fuel element and having the sleeve 42 secured to it, is not left free to possibly interfere with discharging of the fuel element from the reactor.

Pulling on the cable 39 which extends along the fuel element channel and up to the charge face of the reactor, serves to cause the cable 39 to break at 43 and allow withdrawal from the reactor of that part of the cable 39. A cable 39 constituted as aforesaid and of diameter 1/16" reduced at 43 to 0.044" will break at approximately 30 lbs. pulling load, giving a clean break at the reduced portion 43.

I claim:
1. A nuclear reactor fuel element having a thermocouple cable attached thereto, the cable having a weakened portion of reduced cross-sectional area at which the cable breaks preferentially when predetermined tension is applied to the cable, said portion of reduced cross-sectional area being surrounded by a sleeve fixed to the fuel element.

2. A nuclear reactor fuel element having a thermocouple cable attached thereto, the cable having a weakened portion of reduced cross-sectional area at which the cable breaks preferentially when predetermined tension is applied to the cable, said cable being surrounded by a sleeve anchored to the cable on the thermocouple hot junction side of the portion of reduced cross-sectional area, said sleeve extending at least over said portion of reduced cross-section.

3. A nuclear reactor fuel element having a thermocouple cable attached thereto, said cable being attached to the fuel element in the vicinity of its hot junction side, a weakened portion of reduced cross-sectional area in said cable spaced from the point of attachment to said fuel element, and a protective sleeve surrounding said weakened portion for preventing accidental breaking of said weakened portion but for permitting intentional breaking of said weakened portion upon application of predetermined tension to said cable from the unattached free end thereof.

References Cited by the Examiner

UNITED STATES PATENTS

| | | | |
|---|---|---|---|
| 2,985,575 | 5/1961 | Dennis et al. | 176—43 |
| 3,000,803 | 9/1961 | Morris et al. | 176—29 |
| 3,051,641 | 8/1962 | Guneratne et al. | 176—81 |

FOREIGN PATENTS

| | | |
|---|---|---|
| 844,211 | 8/1960 | Great Britain. |

CARL D. QUARFORTH, *Primary Examiner.*

REUBEN EPSTEIN, *Examiner.*